United States Patent
Ibrahim et al.

(10) Patent No.: US 8,243,713 B2
(45) Date of Patent: Aug. 14, 2012

(54) CELLULAR RADIOTELEPHONE SIGNAL WHICH ENABLES SYNCHRONISATION AT AN ENTITY OF A SUPPLEMENTARY CHANNEL BY MEANS OF SYMBOL NUMBERING, AND CORRESPONDING METHOD, TERMINAL AND BASE STATION

(75) Inventors: Nicolas Ibrahim, Montigny le Bretonneux (FR); Dragan Vujcic, Orsay (FR)

(73) Assignee: Wavecom, Issy-les-Moulineaux (FR)

( * ) Notice: Subject to any disclaimer, the term of this patent is extended or adjusted under 35 U.S.C. 154(b) by 734 days.

(21) Appl. No.: 11/547,930

(22) PCT Filed: Mar. 3, 2005
(Under 37 CFR 1.47)

(86) PCT No.: PCT/FR2005/000516
§ 371 (c)(1),
(2), (4) Date: Jan. 27, 2009

(87) PCT Pub. No.: WO2005/109926
PCT Pub. Date: Nov. 17, 2005

(65) Prior Publication Data
US 2010/0015966 A1    Jan. 21, 2010

(30) Foreign Application Priority Data
Apr. 6, 2004  (FR) ..................................... 04 03618

(51) Int. Cl.
*H04J 3/06*    (2006.01)
(52) U.S. Cl. ........ 370/350; 370/503; 370/324; 455/436; 455/450
(58) Field of Classification Search ................... 370/350, 370/503, 324; 455/436, 450
See application file for complete search history.

(56) References Cited

U.S. PATENT DOCUMENTS
6,084,871 A * 7/2000 Engstrom et al. ............. 370/350
(Continued)

FOREIGN PATENT DOCUMENTS
FR    95 05455    5/1995

OTHER PUBLICATIONS
Universal Mobile Telecommunications System (UMTS); UTRA High Speed Downlink Packet Access (HSDPA); Overall description; Stage 2 (3GPP TS 25.308 version 5.4.0 Release 5); ETSI TS 125 308.ETSI Standards, European Telecommunications Standards Institute, SOPHIA-ANTIPO,FR—vol. 3-R2, n°V540, Mar. 2003.

(Continued)

*Primary Examiner* — Jinsong Hu
*Assistant Examiner* — Qun Shen
(74) *Attorney, Agent, or Firm* — David D. Brush; Westman, Champlin & Kelly, P.A.

(57) ABSTRACT

A cellular radiotelephone signal is disclosed of the type that includes a main symmetrical bi-directional channel comprising a main up-link and a main down-link for the low- or medium-speed transmission of signaling and control information and data; and at least one supplementary channel which is assigned solely to the down-link and which is intended for high-speed data transmission using a multi-carrier technique, which ensures that the data are distributed over frequency/time space and which is structured in the form of pre-defined entities. Each entity contains a pre-determined number of symbols. At least one symbol from each entity of the supplementary channel includes a position identifier, which can be used to identify the position of the symbol within the entity, such that a terminal can read the symbol position identifier and deduce therefrom the start of the next entity, thereby obtaining synchronisation at the relevant entity of the supplementary channel.

19 Claims, 2 Drawing Sheets

U.S. PATENT DOCUMENTS

| | | | | |
|---|---|---|---|---|
| 6,111,919 | A * | 8/2000 | Yonge, III | 375/260 |
| 6,278,686 | B1 | 8/2001 | Alard | 370/204 |
| 6,504,830 | B1 | 1/2003 | Ostberg et al. | 370/342 |
| 6,516,199 | B1 | 2/2003 | Soderkvist et al. | 455/502 |
| 6,587,527 | B1 * | 7/2003 | Tani et al. | 375/357 |
| 6,731,673 | B1 * | 5/2004 | Kotov et al. | 375/145 |
| 6,771,670 | B1 * | 8/2004 | Pfahler et al. | 370/503 |
| 6,847,630 | B2 * | 1/2005 | Blanz et al. | 370/350 |
| 6,856,611 | B2 * | 2/2005 | Chaudhuri et al. | 370/335 |
| 6,934,245 | B2 * | 8/2005 | Kwak et al. | 370/204 |
| 6,940,827 | B2 * | 9/2005 | Li et al. | 370/278 |
| 2002/0159413 | A1 * | 10/2002 | Tsubouchi et al. | 370/335 |
| 2005/0063345 | A1 * | 3/2005 | Wu et al. | 370/335 |
| 2006/0171345 | A1 * | 8/2006 | Hildebrand et al. | 370/319 |

OTHER PUBLICATIONS

Ralf Kern et al. Kombination enier OFM-basierten Luftschnittstelle mit einem UMTS-baierten Ansatz mittels Aspassung der zeitlichen Laenge eines OFDM-Multiblocks an die zetliche Laenge eines UMTS-Time Slot; Siemens Tekink Report, vol. 2003-2, Feb. 2003.

International Preliminary Report on Patentability from counterpart foreign application PCT/FR2005/000516.

* cited by examiner

CELLULAR RADIOTELEPHONE SIGNAL WHICH ENABLES SYNCHRONISATION AT AN ENTITY OF A SUPPLEMENTARY CHANNEL BY MEANS OF SYMBOL NUMBERING, AND CORRESPONDING METHOD, TERMINAL AND BASE STATION

CROSS-REFERENCE TO RELATED APPLICATION

This Application is a Section 371 National Stage Application of International Application No. PCT/FR2005/000516, filed Mar. 3, 2005 and published as WO 2005/109926 on Nov. 17, 2005, not in English, the content of which is hereby incorporated by reference in its entirety.

FIELD OF THE DISCLOSURE

The domain of the disclosure is cellular radiotelephony. More precisely, the disclosure relates to transmission of data, particularly at high speeds, in a radiotelephony system.

More precisely, the disclosure relates to a technique enabling synchronisation at the level of the entity considered (frame or sub-frame) of the supplementary channel in a radiotelephony system terminal, as mentioned above.

The disclosure is particularly but not exclusively applicable to synchronisation at the frame or sub-frame level of a supplementary OFDM HS-DPA link (supplementary channel) associated with a UMTS main channel (symmetric two-directional main channel).

BACKGROUND OF THE DISCLOSURE

Known radiotelephony systems such as G.S.M are dedicated essentially to voice communications. They use a channel comprising two symmetrical links: a downlink (from a land base station to a mobile station) and an uplink (from the mobile station to the base station).

Systems currently being developed are also based on such a structure. Thus, the UMTS standard defined by ETSI allows for symmetric distribution between the downlink and the uplink.

It has also been proposed to extend the radiotelephony system by adding at least one supplementary channel to the main channel, in the down direction only and dedicated to high speed data transmission, such as files transmitted on the Internet network.

In the framework of this invention, it is assumed that the radiotelephony system is of the type comprising a symmetric two directional main channel and at least one supplementary channel as mentioned above.

It is also assumed that the supplementary channel uses a multi-carrier technique for distribution of data in the time/frequency space and presents a structure in predefined entities each including a predetermined number of symbols. It should be understood that the predefined entities are frames or sub-frames.

In order to simplify the problem, the following contains a presentation of the disadvantages of prior art with regard to the following particular application: synchronisation at sub-frame level of a supplementary OFDM HS-DPA link associated with a UMTS main channel. However, it is clear that this discussion may be transposed to other radiotelephony systems comprising a symmetric two-directional main channel and at least one supplementary channel. This discussion may also be transposed to synchronisation at the frame level of the supplementary channel.

Note that the HS-DPA (High Speed Downlink Packet Access) supplementary channel is a high-speed downlink associated with the UMTS main channel. Its objective is to increase the downlink speed to offer services requiring high speed (multimedia, video streaming, etc.).

As illustrated in FIG. 1, the UMTS main channel has a structure organised into N, N+1 frames each including 15 slots (time intervals) S1 to S15. As illustrated in FIG. 2, the HS-DPA supplementary channel has a structure organised into N, N+1 frames each including up to 5 sub-frames SF1 to SF5. Furthermore, each slot or sub-frame comprises a set of symbols, and each symbol comprises a set of signal units (chips).

Two technical solutions are proposed for the physical layer of the HS-DPA supplementary channel:
 a spectrum spreading system complying with the UMTS system;
 a system based on an OFDM multi-carrier modulation.

With the first solution, a supplementary UMTS HS-DPA link is obtained that is inherent to the UMTS system. Therefore, it can benefit from all techniques already used by the UMTS main channel such as the channel estimate, control of power and clocks, and particularly synchronisation done with the CPICH signal specified in UMTS standard.

With the second solution, a supplementary OFDM HS-DPA link is obtained that uses a modulation different from that used in the UMTS system (spectrum spreading, CDMA). Consequently, it cannot use all techniques used in the UMTS system. Therefore, it must use specific techniques so as to perform the same functions. Nevertheless, some adaptation to the context may facilitate setting up and maintenance of communication on the OFDM link.

An OFDM sub-frame of the supplementary OFDM HS-DPA link and a UMTS sub-frame of the UMTS HS-DPA UMTS supplementary channel have the same duration (namely 2 ms).

Synchronisation in time is one of the key elements in setting up a communication. This synchronisation is broken down in several "layers" due to the nature of the radio-mobile cellular communication system that defines the two entities: sub-frame and frame (see FIG. 2). Thus, for the HS-DPA supplementary channel, this synchronisation is divided into several steps:
 synchronisation at chip level, that consists of searching for the position of symbols (and therefore chips included in these symbols) depending on the clock used;
 synchronisation at sub-frame level, that consists of searching for the beginning of sub-frames;
 synchronisation at frame level, that consists of searching for the beginning of each frame.

The UMTS HS-DPA supplementary channel may be synchronized relatively easily. As indicated above, because the UMTS HS-DPA supplementary channel is intimately linked to the UMTS system, its synchronisation may be based directly on synchronisation of the UMTS main channel. Thus, the initial synchronisation of the UMTS HS-DPA supplementary channel at chip level may be synchronised by a time self-correlation on a specific synchronisation signal (PSCH) forseen in the UMTS. After this synchronisation has been acquired at chip level, the synchronisation of the UMTS HS-DPA supplementary channel at sub-frame level can be done by searching for the beginning of UMTS slots (knowing that each sub-frame contains a predetermined number of UMTS slots, for example 3). This search is made using the PSCH signal. This signal is in the form of a packet of 256 identical chips emitted at the beginning of each slot. Finally, the frame synchronisation of the UMTS HS-DPA supplementary channel is done using the SSCH (Secondary Synchronisation Channel) signal that has the same shape as the PSCH signal except that the transmitted packets of 256 chips are modulated by known information. FIG. 3 illustrates the order of the different synchronisation steps of the UMTS HS-DPA supplementary channel at chip, slot and frame levels respectively.

On the other hand, at the moment synchronisation of the OFDM HS-DPA supplementary channel is more difficult because this link is not intimately linked to the UMTS system, unlike the UMTS HS-DPA supplementary channel.

According to current practice, the OFDM HS-DPA supplementary channel may be synchronised at chip level using the guard interval that represents part of the OFDM symbol (the last part). This synchronisation at chip level is obtained by a simple classical self-correlation on the received OFDM HS-DPA signal.

But once this synchronisation has been obtained at chip level, it is impossible to know the beginning of sub-frames and frames because the OFDM signal specified for the HS-DPA does not contain the PSCH and SSCH signals necessary for synchronisations at sub-frame and frame levels.

According to current practice, synchronisation of the OFDM HS-DPA supplementary channel at sub-frame level is specific to the OFDM system and is based on insertion of specific signals (in the form of OFDM symbols) to synchronisation at sub-frame level.

The major disadvantage of current practice is that the above mentioned specific synchronisation signals increase the load on the OFDM HS-DPA supplementary channel, or if the load is fixed, lower the useful speed.

SUMMARY

An embodiment of the invention relates to a cellular radiotelephony signal of the type including:
- a main symmetric two-directional channel comprising a main uplink and a main downlink, particularly transmitting signalling and control data and information at low or medium speed;
- at least one supplementary channel assigned to the down direction only, particularly for high speed data transmission, using a multi-carrier technique for distribution of data in the time/frequency space, and with a structure in predefined entities each including a predetermined number of symbols.

According to an embodiment of the invention, at least one symbol of each entity of the supplementary channel comprises a position identifier used to identify the position of said symbol in said entity, such that a terminal can read the position identifier of said symbol and use it to deduce the beginning of the next entity, thus obtaining synchronisation of the supplementary channel at the level of the entity considered.

In a first particular embodiment of the invention, said predefined entities are sub-frames of the supplementary channel.

In a second particular embodiment of the invention, said predefined entities are frames of the supplementary channel.

Preferably, each symbol of the supplementary channel comprises a position identifier.

The fact that all symbols comprise a position identifier provides a means of optimising synchronisation at the entity considered (frame or sub-frame) of the supplementary channel.

However, it is clear that an embodiment of the invention also covers cases in which only some symbols (or even only one symbol) in each entity contain a position identifier.

In a first particular embodiment of the invention, said position identifier is inserted in frequency.

Advantageously, in the case in which said multi-carrier technique uses a plurality of sub-carrier frequencies distributed on a determined frequency band, said position identifier comprises bits carried by sub-carriers grouped in a same predefined portion of said frequency band, so as to use a quasi-constant channel.

Advantageously, said position identifier is coded with differential coding.

In a second particular embodiment of the invention, said position identifier is inserted in time.

Advantageously, the main channel and/or the supplementary channel transmit information about the rank of a sub-frame within a frame of the structure of the supplementary channel, the beginning of which can be detected so as to enable synchronisation of the supplementary channel at frame level by detecting the beginning of the next frame as a function of said synchronisation at sub-frame level and said information about the rank of said sub-frame.

Advantageously, the main channel and/or the supplementary channel also transmit information about the transmission mode of sub-frames on the supplementary channel, said synchronisation of the supplementary channel at frame level also being a function of said information about the transmission mode.

In one advantageous embodiment of the invention, the main channel uses a spectrum spreading access technique (CDMA) and is preferably a UMTS link. Furthermore, said supplementary channel for example uses a multi-carrier technique based on OFDM modulation or IOTA modulation.

The principle and use of the IOTA modulation are described in French patent application FR-95 05455 incorporated herein by reference.

Advantageously, the main channel firstly transmits a notification inviting said terminal to do said synchronisation at the level of the entity considered of the supplementary channel, so as to change the terminal over from the main channel to the supplementary channel.

Note that this notification procedure (that preferably uses the paging channel of the main channel) may be used to start any type of synchronisation procedure at the entity considered (frame or sub-frame) of the supplementary channel, and therefore also the above mentioned classical procedure (in other words based on specific synchronisation signals transmitted on the supplementary channel).

Therefore, within the framework an embodiment of this invention, this notification invites the terminal to detect and read a position identifier of a current symbol on the supplementary channel.

Preferably, said notification is transmitted on a paging channel included in said main channel.

An embodiment of the invention also relates to a method for synchronisation of a supplementary channel associated with said symmetric two-directional main channel; said symmetric two-directional main channel comprising a main uplink and a main downlink, particularly for transmission of signalling and control data and information at low or medium speed, said supplementary channel being assigned to the down direction only, particularly for transmission of high speed data using a multi-carrier technique for distribution of data in the time/frequency space, and with a structure in predefined entities each including a predetermined number of symbols. According to an embodiment of the invention, the method comprises a step for synchronisation of the supplementary channel at the level of the entity considered, itself including the following steps:

detect and read a position identifier of a current symbol on the supplementary channel, said position identifier being used to identify the position of said symbol in the entity to which it belongs;

deduce the beginning of the next entity as a function of the position identifier of the current symbol.

An embodiment of the invention also relates to a terminal of a cellular radiotelephony system of the type comprising means of transmission of a main uplink, means of reception of a main downlink and means of reception of at least one supplementary channel; said main uplink and said main downlink forming a symmetric two-directional main channel, particularly for low or medium speed transmission of signalling and control data and information; said supplementary channel being assigned to the down direction only, particularly for transmission of high speed data, using a multi-carrier technique for distribution of data in the time/frequency space, and with a structure in predefined entities each including a predetermined number of symbols. According to an embodiment of the invention, the terminal comprises means of synchronisation of the supplementary channel at the level of the entity considered, themselves including:

means of detection and reading of a position identifier of a current symbol on the supplementary channel, said position identifier being used to identify the position of said symbol in the entity to which it belongs;

means of deducing the beginning of the next entity as a function of the position identifier of the current symbol.

An embodiment of the invention also relates to a base station in a cellular radiotelephony system, of the type comprising reception means for a main uplink, transmission means for a main downlink, and transmission means of at least one supplementary channel; said main uplink and said mean downlink forming a symmetric two-directional main channel particularly for low or medium speed transmission of signalling and control data and information; said supplementary channel being assigned to the down direction only, particularly for high speed data transmission, using a multi-carrier technique for distribution of data in the time/frequency space, and with a structure in predefined entities each including a predetermined number of symbols. According to an embodiment of the invention, the base station comprises means of inserting a position identifier in at least one symbol of each entity in the supplementary channel, said position identifier being used to identify the position of said symbol in said entity, such that a terminal can read the position identifier of said symbol and use it to deduce the beginning of the next entity, thus obtaining synchronisation of the supplementary channel at the level of the entity considered.

Other special features and advantages will become clearer after reading the following description of said preferred embodiment of the invention, given as an example for guidance and in no way limitative, and the appended figures.

DETAILED DESCRIPTION OF ILLUSTRATIVE EMBODIMENTS

In the remainder of the description, the case of a cellular radiotelephony signal comprising a UMTS main channel (symmetric two-dimensional main channel) and an OFDM HS-DPA link (supplementary channel), as an example.

An embodiment of the invention defines the characteristics of this signal used to facilitate synchronisation of the supplementary OFDM HS-DPA link at sub-frame, chip and frame levels.

Figure 4:
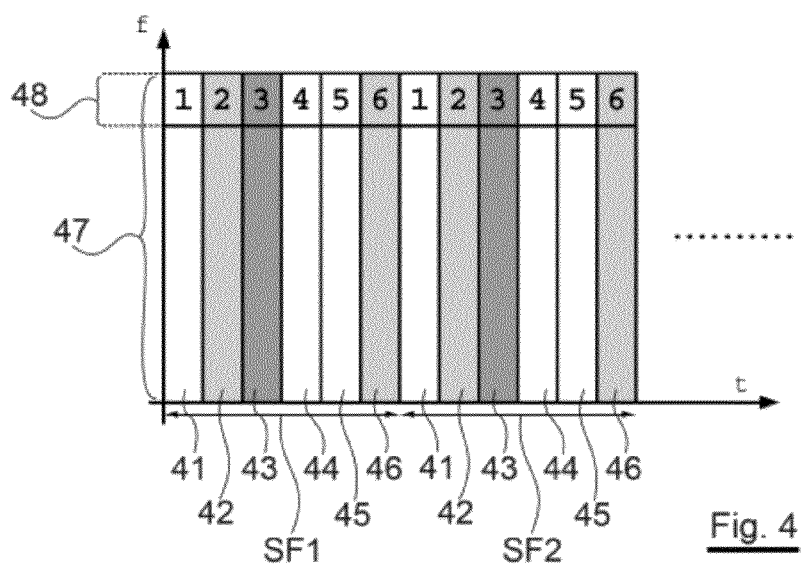
FIG. 4 illustrates a supplementary OFDM HS-DPA link according to one particular embodiment of the invention in which the symbols are numbered.

FIG. 4 illustrates an OFDM HS-DPA supplementary channel according to a particular embodiment of the invention in which the symbols are numbered.

Figure 1:
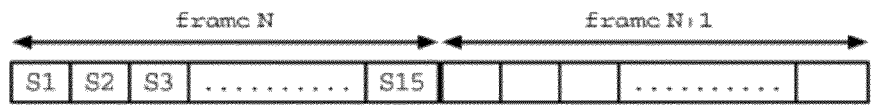
FIG. 1 illustrates the known structure of a UMTS main channel, organised in frames and slots.
Figure 2:
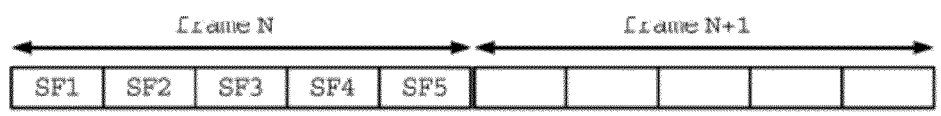
FIG. 2 illustrates the known structure of a supplementary HS-DPA link (OFDM or UMTS), organised in frames and sub-frames.
Figure 3:
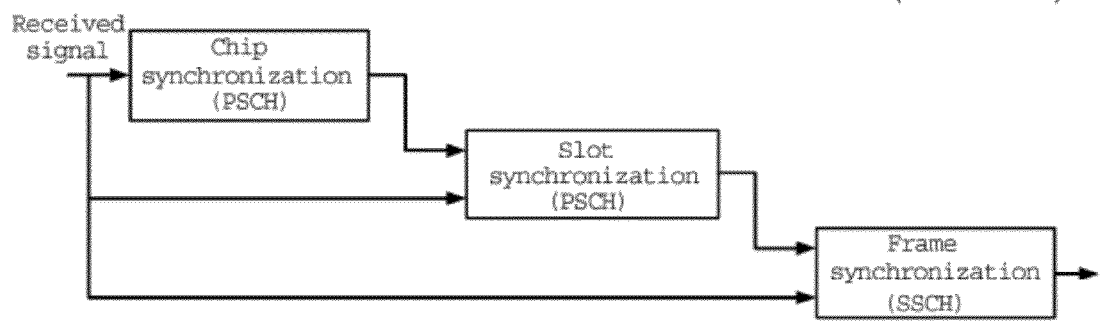
FIG. 3 illustrates relations between the three synchronisations of the UMTS HS-DPA supplementary channel, according to the state of the art, at the chip, slot and frame levels respectively.

As already indicated above (see discussion in FIG. 2), the OFDM HS-DPA supplementary channel presents a structure organised in N, N+1 frames each including up to 5 sub-frames SF1 to SF5, each 2 ms. Each sub-frame SF1 to SF5 comprises a set of symbols. Each symbol comprises a set of signal units (chips).

In the example illustrated in FIG. 4, there are two successive sub-frames SF1, SF2 in the OFDM HS-DPA supplementary channel. Each comprises six symbols 41 to 46. Conventionally, each OFDM HS-DPA symbol is coded on a plurality of sub-carrier frequencies distributed on a predetermined frequency band 47.

In the particular embodiment of the invention illustrated in FIG. 4, each OFDM HS-DPA symbol comprises a position identifier indicating its position within the sub-frame in which it is contained. In this case, the position identifier is a number in a sequence of numbers varying from 1 to 6, and that is repeated in each sub-frame.

More generally, note that in the framework of an embodiment of this invention, the supplementary channel has a structure in predefined entities (frames, sub-frames or others) each comprising a predetermined number of symbols, and the position identifier included in a given symbol indicates the position of this symbol within the entity in which it is contained.

The position of the number (or more generally the position identifier) in each symbol must be known by the receiver in advance (also called a terminal). Thus, when it receives the OFDM HS-DPA supplementary channel, the terminal can read the position identifier of the current symbol and deduce the beginning of the next sub-frame from it (see detailed description given below, with reference to FIG. 5). In this way, the terminal does a synchronisation of the supplementary channel at sub-frame level.

In the example illustrated in FIG. 4, the position identifier is inserted in frequency in the OFDM HS-DPA supplementary channel. In other words, the position identifier of each symbol is added to the source signal data before execution of the inverse Fourier transform (TFDI) or any other processing that controls the changeover from frequency to time. Remember that the multi-carrier technique typically comprises the following steps: the source signal is subject to channel coding (if it is a digital signal) or is simply sampled (if it is an analogue signal); data are then interlaced in frequency and/or time to form a series of so-called OFDM symbols; these symbols are then processed, for example by an inverse Fourier transform (TFDI), and are affected by a digital/analogue conversion and a transposition to RF, before being sent.

The position identifier included in each symbol may for example be coded with differential coding such that the receiver (terminal) can decode it without knowing the propagation channel. Note in fact that the receiver must identify the position identifier before the receiver knows the propagation channel (in other words without equalisation).

Furthermore, the bits of the position identifier may for example be carried by sub-carriers grouped in a same predefined portion 48 of the frequency band 47, so that the channel is almost constant. This recommendation can be made because the quantity of information necessary to code the position identifier (number) is small.

According to one variant of the invention (not illustrated), the position identifier is inserted in time in the OFDM HS-DPA supplementary channel. In other words, the position identifier of each symbol is added to the source signal data after execution of the inverse Fourier transform (TFDI) or other processing, for the changeover from frequency to time.

Figure 5:
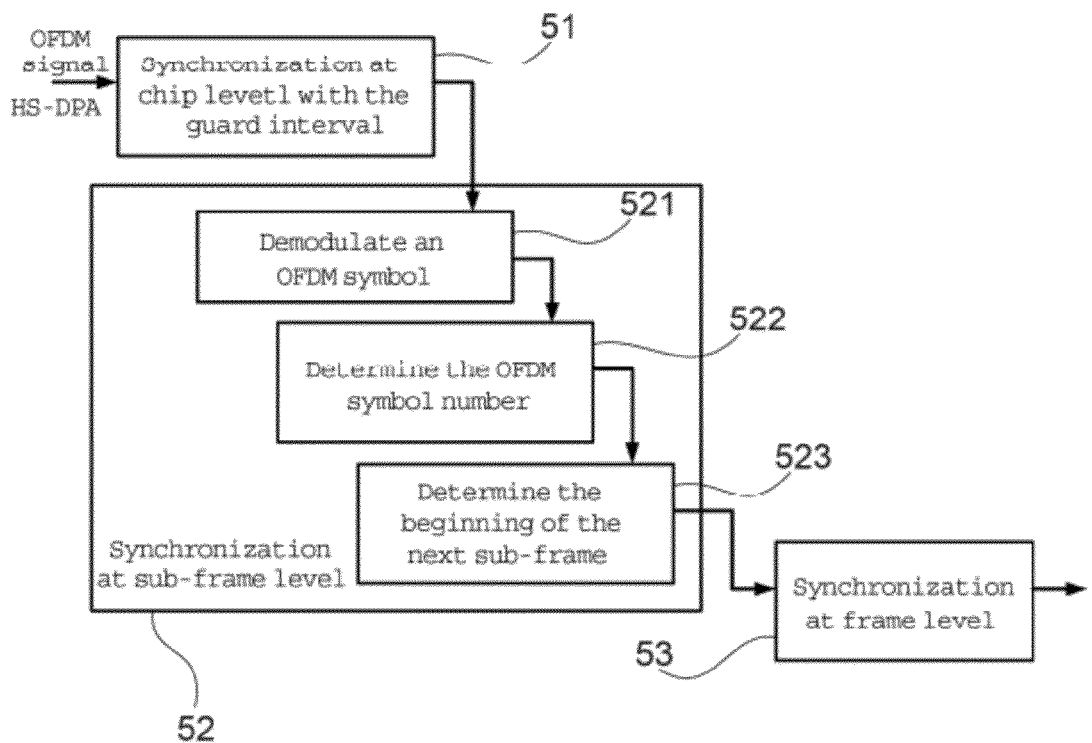
FIG. 5 illustrates relations between the three synchronisations of the OFDM HS-DPA supplementary channel using the technique according to an embodiment of the invention, at the chip, sub-frame and frame levels respectively.

FIG. 5 illustrates relations between the three synchronisations of the OFDM HS-DPA supplementary channel using the technique according to an embodiment of the invention, at the chip, sub-frame and frame levels respectively.

The terminal firstly synchronises the OFDM HS-DPA supplementary channel, reference 51, at chip level. For example, this link may be obtained by self-correlation on the guard interval, which represents the last part of the OFDM symbol.

The terminal then does the synchronisation (operation reference 52) of the OFDM HS-DPA supplementary channel at sub-frame level. Once the synchronisation has been obtained at chip level, it is possible to demodulate an OFDM HS-DPA symbol (operation reference 521) because the beginning and the end of the symbol are known. After demodulation of the OFDM symbol, the terminal determines the number (position identifier) of this symbol in the sub-frame to which it belongs (operation reference 522). This number gives information about the beginning and end of the sub-frame and therefore, finally, is used to determine the beginning of the next sub-frame (operation reference 523), in other words to know synchronisation of the OFDM HS-DPA supplementary channel at sub-frame level.

Optionally, the cellular radiotelephony signal according to an embodiment of the invention also makes it easy for the terminal to synchronise the OFDM HS-DPA supplementary channel (operation reference 53) at frame level, after synchronisation has been done (operation reference 52) at sub-frame level.

For example, this requires that the terminal knows:
the rank of the sub-frame for which the beginning has been detected during the synchronisation step 52 of the OFDM HS-DPA supplementary channel at sub-frame level within a frame in the OFDM HS-DPA supplementary channel,
the transmission mode of sub-frames on the OFDM HS-DPA supplementary channel. There may be several different modes: transmission of all sub-frames, of one frame out of three, etc.

Starting from the above-mentioned rank, the above-mentioned transmission mode and synchronisation at sub-frame level, the terminal can detect the beginning of the next frame in the OFDM HS-DPA supplementary channel.

For example, the terminal can know the rank and transmission mode mentioned above by transmission of information related to this rank and this transmission mode through the UMTS main channel. It would also be possible for this information transmission to be done by the OFDM HS-DPA supplementary channel, alone or in combination with the UMTS main channel.

It is clear that many other embodiments of the invention could be envisaged.

In particular, it would be possible for only some of the symbols to include a position identifier.

It would also be possible for the UMTS main channel to firstly transmit a notification inviting the terminal to do the synchronisation of the OFDM HS-DPA supplementary channel at sub-frame level, for the terminal changeover from the UMTS main channel to the OFDM HS-DPA supplementary channel.

For example, this notification is transmitted on the paging channel (PICH "Paging Indicator Channel") included in the UMTS main channel. Remember that the PICH channel belongs to the UMTS system and is composed of 300 bits (b0; ...b299) transmitted during the period of a 10 ms frame. The length of the spreading sequence used is 256. The last 12 bits (b288, ...b299) are not used in the UMTS standard and are therefore free. For example, these 12 bits may be used as follows to notify the changeover to the OFDM HS-DPA supplementary channel:
4 bits for notification of the changeover to the supplementary channel (these bits may contain information about the carrier frequency of the additional channel);
8 bits to indicate the service type, the speed, the exchange method, etc.

An embodiment of the invention therefore provides a new technique to facilitate synchronisation at the entity considered (frame or sub-frame) of the supplementary channel in a cellular radiotelephony system (particularly an OFDM HS-DPA supplementary channel associated with a UMTS main channel).

An embodiment of the invention provides such a technique that limits additional specific signals to synchronisation at the entity considered, and maintains the initially defined structure for the supplementary channel.

An embodiment of the invention provides such a technique that is inexpensive and easy to implement.

An embodiment of the invention provides such a technique that, if it enables synchronisation of the supplementary channel at sub-frame level, also facilitates synchronisation of the supplementary channel at frame level.

Although the present disclosure has been described with reference to various embodiments, workers skilled in the art will recognize that changes may be made in form and detail without departing from the spirit and scope of the invention.

The invention claimed is:

1. A method comprising:
transmitting cellular radiotelephony signals on a main symmetric two-directional channel comprising a main uplink and a main downlink, particularly transmitting signaling and control data and information at low or medium speed;
transmitting, with a device, further cellular radiotelephony signals on at least one supplementary channel assigned to the down direction only, particularly for high speed data transmission, using a multi-carrier technique for distribution of data in the time / frequency space, and with a structure in predefined entities each including a predetermined number of symbols, said predefined entities being sub-frames or frames of the supplementary channel;
transmitting on the main channel a notification inviting a terminal to synchronize the supplementary channel at a level of the entity considered, for a changeover of the terminal from the main channel to the supplementary channel; and inserting, with the device, a position identifier into at least one symbol of each entity received via the supplementary channel, which identifies among the predetermined number of symbols the position of said symbol in said entity, such that the terminal can read the position identifier of said symbol and use it to deduce the beginning of the next entity by predetermined sequence of position identifiers, thus obtaining synchronization of the supplementary channel at the level of the entity considered.

2. The method according to claim 1, wherein each symbol of the supplementary channel comprises a position identifier.

3. The method according to claim 1, wherein the method comprises a step of inserting said position identifier in frequency.

4. The method according to claim 3, said multi-carrier technique using a plurality of sub-carrier frequencies distributed on a determined frequency band, wherein said position identifier comprises bits carried by sub-carriers grouped in a same predefined portion of said frequency band, so as to use a quasi-constant channel.

5. The method according to claim 3, wherein said position identifier is coded with a differential coding.

6. The method according to claim 1, wherein said step of inserting said position identifier is carried out in time.

7. The method according to claim 6, wherein said predefined entities are sub-frames of the supplementary channel, and wherein at least one of the main channel or the supplementary channel transmits information about a rank of a sub-frame within a frame of the structure of the supplementary channel, the beginning of which can be detected so as to enable synchronization of the supplementary channel at frame level by detecting the beginning of the next frame as a function of said synchronization at sub-frame level and said information about the rank of said sub-frame.

8. The method according to claim 7, wherein at least one of the main channel or the supplementary channel also transmits information about a transmission mode of sub-frames on the supplementary channel, said synchronization of the supplementary channel at frame level also being a function of said information about the transmission mode.

9. The method according to claim 1, wherein the main channel uses a spectrum spreading access technique.

10. The method according to claim 1, wherein said supplementary channel uses a multi-carrier technique based on OFDM modulation or IOTA modulation.

11. The method according to claim 1, wherein said notification is transmitted on a paging channel included in said main channel.

12. A method for synchronization, by a terminal, of a supplementary channel associated with a symmetric two-directional main channel, said symmetric two-directional main channel comprising a main uplink and a main downlink, particularly for transmission of signaling and control data and information at low or medium speed, said supplementary channel being assigned to the down direction only, particularly for transmission of high speed data using a multi-carrier technique for distribution of data in the time / frequency space, and with a structure in predefined entities each including a predetermined number of symbols, wherein said predefined entities are sub-frames or frames of the supplementary channel, receiving from the main channel a notification inviting said terminal to do said synchronization of the supplementary channel at a level of the entity considered, for a changeover of the terminal from the main channel to the supplementary channel, wherein the terminal performs synchronizing of the supplementary channel at the level of the entity considered, wherein synchronizing comprises:

detecting and reading a position identifier comprised within a current symbol received via the supplementary channel, said position identifier being used to identify, among the predetermined number of symbols, the position of said current symbol in the entity to which it belongs; and deducing, by a predetermined sequence of position identifiers, the beginning of the next entity as a function of the position identifier of the current symbol.

13. The method according to claim 12, wherein each symbol of the supplementary channel comprises a position identifier.

14. The method according to claim 12, wherein said position identifier is inserted in frequency.

15. The method according to claim 14, said multi-carrier technique using a plurality of sub-carrier frequencies distributed on a determined frequency band, wherein said position identifier comprises bits carried by sub-carriers grouped in a same predefined portion of said frequency band, so as to use a quasi-constant channel.

16. The method according to 14, wherein said position identifier is coded with differential coding.

17. The method according to claim 12, wherein said position identifier is inserted in time.

18. A terminal in a cellular radiotelephony system, comprising:

a transmitter, which transmits a main uplink, a receiver, which receives a main downlink and a receiver, which receives at least one supplementary channel, said main uplink and said main downlink forming a symmetric two-directional main channel, particularly for low or medium speed transmission of signaling and control data and information, said supplementary channel being assigned to the down direction only, particularly for transmission of high speed data, using a multi-carrier technique for distribution of data in the time / frequency space, and with a structure in predefined entities each including a predetermined number of symbols, wherein said predefined entities are sub-frames of the supplementary channel;

a synchronizer, which receives from the main channel a notification inviting said terminal to synchronize the supplementary channel at a level of the entity considered, for a changeover of the terminal from the main channel to the supplementary channel, wherein the synchronizer comprises:

elements that detect and read a position identifier comprised within a current symbol received via the supplementary channel, said position identifier being used to identify, among the predetermined number of symbols, the position of said symbol in the entity to which it belongs; and elements that deduce, by a predetermined sequence of position identifiers, the beginning of the next entity as a function of the position identifier of the current symbol.

19. A base station in a cellular radiotelephony system, the base station comprising:

a receiver, which receives a main uplink, a transmitter, which transmits a main downlink, and a transmitter, which transmits at least one supplementary channel, said main uplink and said main downlink forming a symmetric two-directional main channel particularly for low or medium speed transmission of signaling and control data and information, said supplementary channel being assigned to the down direction only, particularly for high speed data transmission, using a multi-carrier technique for distribution of data in the time / frequency space, and with a structure in predefined entities each including a predetermined number of symbols, wherein said predefined entities are sub-frames or frames of the supplementary channel, wherein the base station is configured to transmit on the main channel a notification inviting a terminal to synchronize the supplementary channel at a level of the entity considered, for a changeover of the terminal from the main channel to the supplementary channel, and is configured to insert a position identifier in at least one symbol of each entity received via the supplementary channel, said position identifier being used to identify, among the predetermined number of symbols, the position of said symbol in said entity, such that the terminal can read the position identifier of said symbol and use it to deduce, by a predetermined sequence of position identifiers, the beginning of the next entity, thus obtaining synchronization of the supplementary channel at the level of the entity considered.

* * * * *